Figure 1:
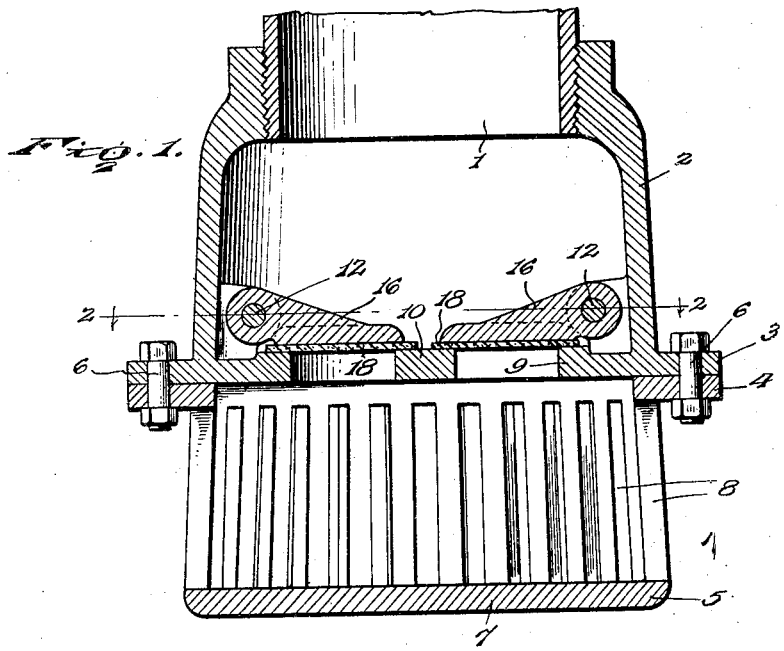

June 19, 1928.

O. C. KUEHNE

VALVE

Filed April 29, 1925

1,673,831

Inventor

O. C. Kuehne.

By Lacey & Lacey, Attorneys

Patented June 19, 1928.

1,673,831

UNITED STATES PATENT OFFICE.

OSCAR C. KUEHNE, OF SAN ANTONIO, TEXAS.

VALVE.

Application filed April 29, 1925. Serial No. 26,717.

This invention relates to valves and has special reference to foot valves which are used at the foot of a suction tube through which liquid is drawn from a well or tank by the action of a pump. The primary object of the invention is to avoid the use of gaskets between the valve seat and the strainer and to eliminate machine work so that the cost of the device will be minimized and the efficiency thereof increased. One embodiment of the invention is illustrated in the accompanying drawing and will be hereinafter fully described, the novel features being particularly pointed out in the appended claim.

Figure 2:
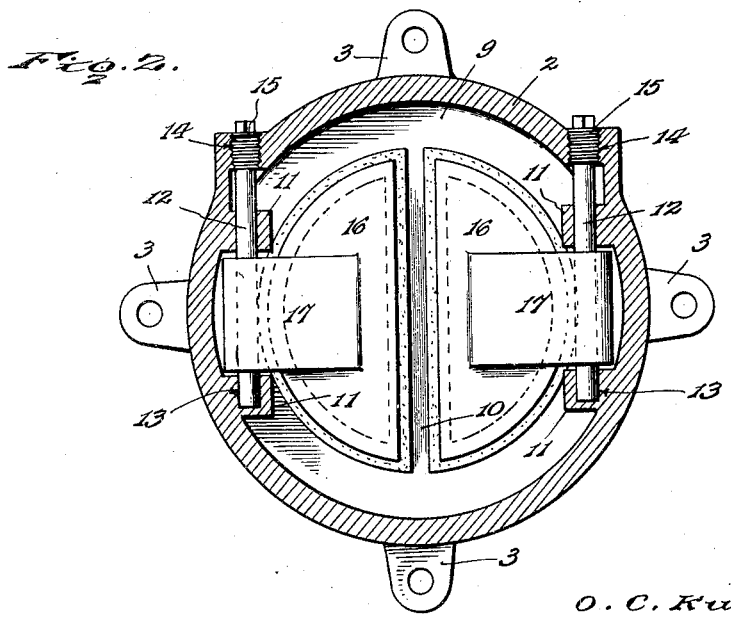

In the drawing:

Figure 1 is a vertical diametrical section of a valve constructed in accordance with the present invention, and Fig. 2 is a horizontal section on the line 2—2 of Fig. 1.

In the drawing, the reference numeral 1 indicates the lower end of the suction tube or barrel of the pump and 2 designates the valve casing or body which is threaded onto the lower end of the suction tube. The casing or valve body 2 is provided at its lower end externally with a plurality of lugs 3, against the under side of which lugs 4 at the upper end of a strainer 5 abut, securing bolts 6 being inserted through the mating lugs to secure the strainer to the casing. The strainer may be of any desired form and is illustrated as having an imperforate bottom 7 and provided in its side wall with a plurality of vertical slots 8. At the lower end of the valve casing 2 and extending across the same is a valve seat spider 9 which is cast integral with the casing and has a marginal portion coextensive with the inner circumference of the valve casing and a diametrical portion 10 disposed centrally of the spider and the valve casing. Also formed integral with the valve body immediately above the marginal portion of the spider 9 and at diametrically opposite sides of the central bar 10 thereof are lugs 11 which are provided in pairs and are adapted to receive hinge pins 12. One lug of each pair of lugs 11 is provided with a socket 13 to receive one end of the pin 12, while the other lug of the pair has an opening extending entirely therethrough and in axial alinement with the socket. In the wall of the valve casing and alined axially with the adjacent lug is a threaded bore, indicated at 14 through which the pin 12 is inserted to be engaged through the lugs and after the pin is inserted a plug 15 is threaded into the bore so as to abut the adjacent end of the pin and thereby retain the same in its operative position. A pair of flap valves 16 is provided and each valve is substantially semi-circular in plan and provided centrally at its arcuate edge with a lug or hinge body 17 which is provided with a passage to pivotally encircle the pin 12, the lug or body 17 fitting between the lugs 11 on the valve casing, as clearly shown in Fig. 2. The under side of each valve body 16 is equipped with a packing 18 of any suitable material whereby a watertight joint with the spider may be effected when the valve is closed.

In operation, on the suction stroke of the pump, the liquid will be drawn in through the strainer and will rise through the spider 9, the valves 16 automatically swinging upwardly to permit flow of the liquid into and through the suction tube. On the reverse stroke of the pump, the valves will close through the force of gravity and thereby retain in the suction tube the liquid which has entered the same and filled the valve casing.

In the foot valves heretofore employed, the valve has been generally fitted between the strainer and the valve casing or so mounted as to rest upon a seat which was secured between the valve casing and the strainer or formed upon the strainer and, as a result, gaskets were employed between the strainer and the valve casing to avoid a leaky joint. This construction was very expensive inasmuch as a lot of machine work was necessary and after the device had been in use for sometime leakage would occur through wear upon the gasket. Also the joint would become defective through freezing and rusting, necessitating frequent repairs and, when the joint had been badly rusted, the work of disassembling the parts was very difficult. With the present invention, the valve seat is formed integral with the valve casing and, consequently, there is no joint between the seat and the casing so that practically all machine work is eliminated and the valves may be smaller than heretofore and, therefore, employed in more restricted places. The use of a gasket between the valve casing and the strainer is unnecessary inasmuch as the valve seat is in overhanging relation to the strainer and possible leakage between the valve casing and the strainer is immaterial. No bolts are employed in the valve proper so that the rusting of joints about the valve and consequent failure of the valve to operate properly is overcome. The valves may be very easily assembled with the valve casing inasmuch as they are small enough to be easily inserted through the opening in the upper end of the casing and placed in proper position with respect to the lugs 11 on the interior of the casing, after which the pins 12 may be inserted through the side of the casing into engagement with the respective lugs on the casing and the valve, the opening being closed by the threaded plugs, as shown and above described. The device is exceedingly simple and will operate efficiently for a very long period.

While I have specifically described the strainer as removable from the valve casing, it is to be understood that said parts may be integral and that various other changes may be made in the details without involving a departure from the invention as the same is defined in the following claim.

Having thus described the invention, I claim:

A foot valve comprising a cylindrical valve casing open at its top and having its upper end adapted to be secured to a pump barrel, a spider formed integral with the lower end of the casing and having a marginal portion extending entirely about the walls of the casing and projecting inwardly therefrom, companion bearing ears in said casing disposed above the marginal portion of said spider and formed integral with the marginal portion and walls of the casing, one ear being formed with a bore and the other with a socket facing the bore, a flap valve in said casing resting flat upon the marginal portion of said spider when closed, a hinge ear extending from the upper face of said flap valve and projecting radially therefrom with its outer end portion fitting between the companion bearing ears and formed with a bore alined with the bore and socket thereof, said casing having its wall formed with a threaded opening alined with the bore and socket of the bearing ears, a pivot pin for said flap valve passed through the alined bores and having one end seated in said socket and its outer end terminating adjacent the inner end of the threaded opening, and a plug screwed into the threaded opening and engaging the last-mentioned end of said pin to retain the pin in place.

In testimony whereof I affix my signature.

OSCAR C. KUEHNE. [L. S.]